(12) United States Patent
Kotikalapoodi et al.

(10) Patent No.: US 7,705,557 B2
(45) Date of Patent: Apr. 27, 2010

(54) SMART BATTERY CHARGING AND POWER MANAGEMENT CIRCUIT WITH OPTIONAL POWER SOURCE SELECTION BASED ON LOAD CURRENT

(75) Inventors: Sridhar Kotikalapoodi, Santa Clara, CA (US); Farzan Roohparvar, Monte Sereno, CA (US); Tivadar Szabo, San Jose, CA (US); Manisha Pandya, Anaheim Hills, CA (US)

(73) Assignee: Broadcom Corporation, Irvine, CA (US)

( * ) Notice: Subject to any disclaimer, the term of this patent is extended or adjusted under 35 U.S.C. 154(b) by 417 days.

(21) Appl. No.: 11/729,847

(22) Filed: Mar. 30, 2007

(65) Prior Publication Data

US 2008/0238203 A1 Oct. 2, 2008

(51) Int. Cl.
*H01M 10/46* (2006.01)
(52) U.S. Cl. .................................... 320/107
(58) Field of Classification Search ................. 320/107, 320/128, 134, 136, 141
See application file for complete search history.

(56) References Cited

U.S. PATENT DOCUMENTS

| 4,742,291 A * | 5/1988 | Bobier et al. ............... 320/101 |
| 6,741,066 B1 * | 5/2004 | Densham et al. ............ 320/145 |
| 2003/0168916 A1 * | 9/2003 | Matsuda et al. ............... 307/75 |

* cited by examiner

*Primary Examiner*—Edward Tso
(74) *Attorney, Agent, or Firm*—Sterne, Kessler, Goldstein & Fox P.L.L.C.

(57) ABSTRACT

Traditionally, system loads are placed in parallel with the battery. This simple topology wastes the available power if the USB power and/or wall adapter is present. Recent topologies have made some improvements by powering the load by the maximum available voltage. Thus, if a USB power source or wall adapter is present, the load is powered by them rather than the battery, thus improving the system efficiency. However, since the USB power and wall adapter power are current limited, if the load requires higher current than the current limited USB or adapter, then the entire system is powered at voltage of the battery. The present invention further improves the system efficiency by distinguishing the load and powering the constant power loads by the maximum voltage and placing the constant current loads in parallel with the battery.

17 Claims, 10 Drawing Sheets

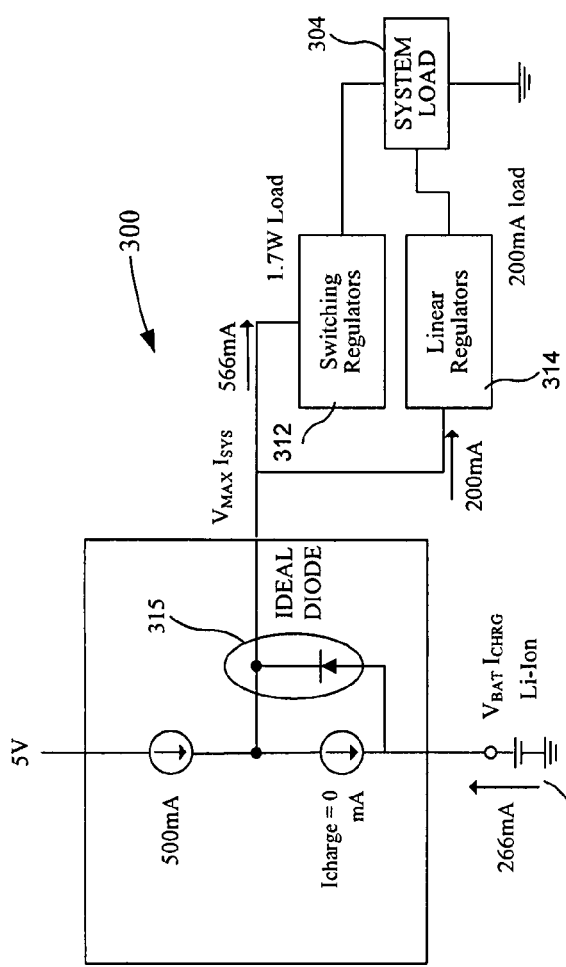
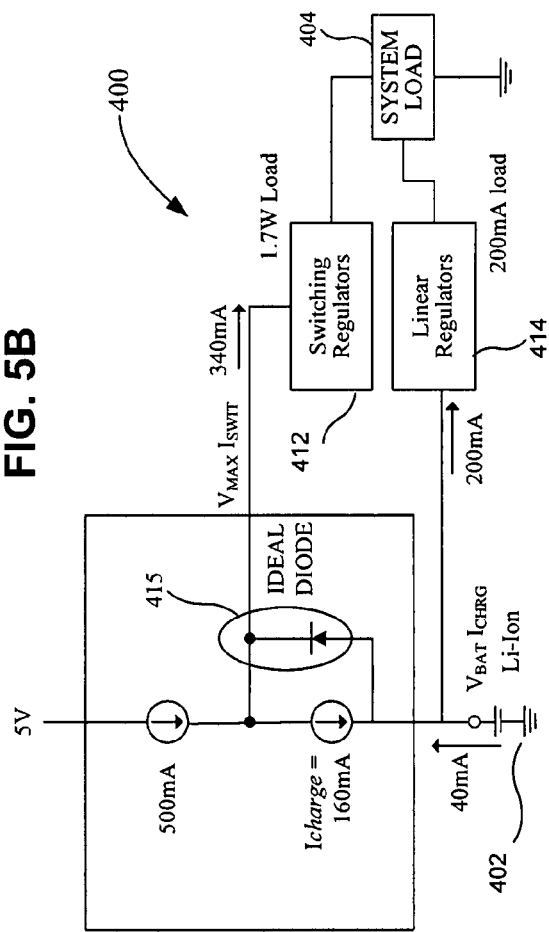
FIG. 5A
FIG. 5B

SMART BATTERY CHARGING AND POWER MANAGEMENT CIRCUIT WITH OPTIONAL POWER SOURCE SELECTION BASED ON LOAD CURRENT

FIELD OF THE INVENTION

The present invention relates to a battery charging and power management circuit.

BACKGROUND OF THE INVENTION

Long battery life is an essential feature for any portable devices, particularly laptops, PDAs, and mobile phones. These mobile devices typically have a battery charger capable of being charged with a wall adapter or through a universal serial bus (USB) connection. Currently available battery charger designs are generally deficient in number of ways.

In one design, power from a higher voltage source is not properly utilized which causes the battery to discharge rather than being charged in certain cases.

In another design, the load of the system is not being properly distinguished and managed, which leads to unnecessary discharge of the battery power.

Accordingly, it is desirable to have a battery charging system that addresses the above deficiencies.

BRIEF DESCRIPTION OF THE DRAWINGS/FIGURES

The present invention is described with reference to the accompanying drawings.

FIGS. 1A-B illustrate block circuit diagrams of a charger fed topology.

FIGS. 2A-B illustrate block circuit diagrams of an intermediate voltage bus.

FIGS. 3A-B illustrate block circuit diagrams of a power system.

FIGS. 4A-B illustrate block circuit diagrams of a power system according to an embodiment of the present invention.

FIG. 5A illustrates exemplary power requirements for the system of FIG. 3A.

FIG. 5B illustrates exemplary power requirements for the system of FIG. 4A.

DETAILED DESCRIPTION OF THE INVENTION

This specification discloses one or more embodiments that incorporate the features of this invention. The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described. An embodiment of the present invention is now described. While specific methods and configurations are discussed, it should be understood that this is done for illustration purposes only. A person skilled in the art will recognize that other configurations and procedures may be used without departing from the spirit and scope of the invention.

Figure 1A:
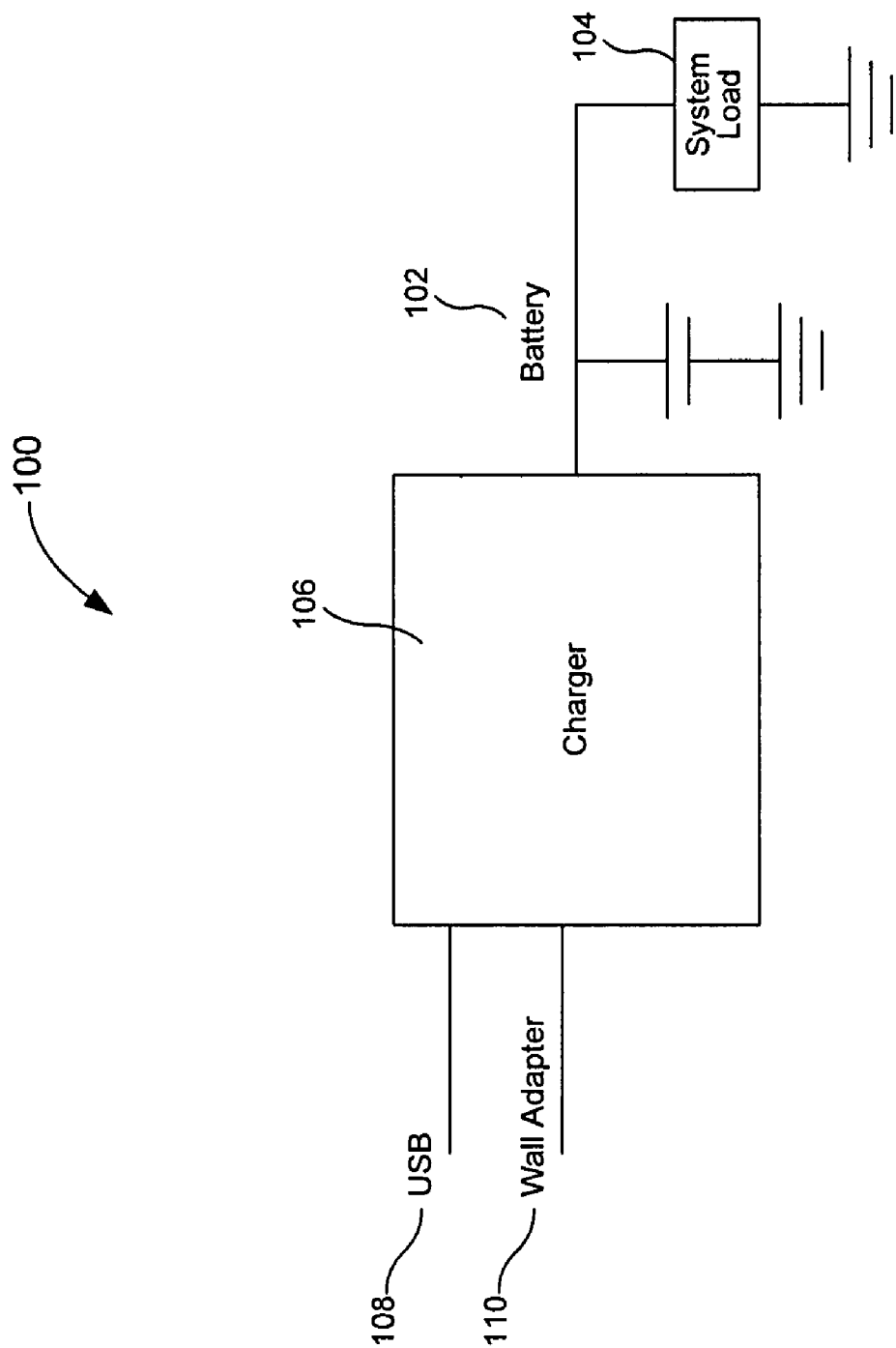

FIG. 1A shows a typical battery charger topology 100 which includes a battery 102, a system load 104, a charger 106, a USB power port 108, and a wall plug power port 110. Battery 102 is directly coupled in parallel with system load 104. The charger 106 is coupled between the battery 102 and the power ports 108 and 110.

The topology 100 is simple in design but is deficient in many ways, one of which is the inefficient use of other available power sources. As shown, the system load 104 is directly connected in parallel with the battery 102. The charger 106 is located between the battery 102 and the power ports 108 and 110.

Figure 1B:
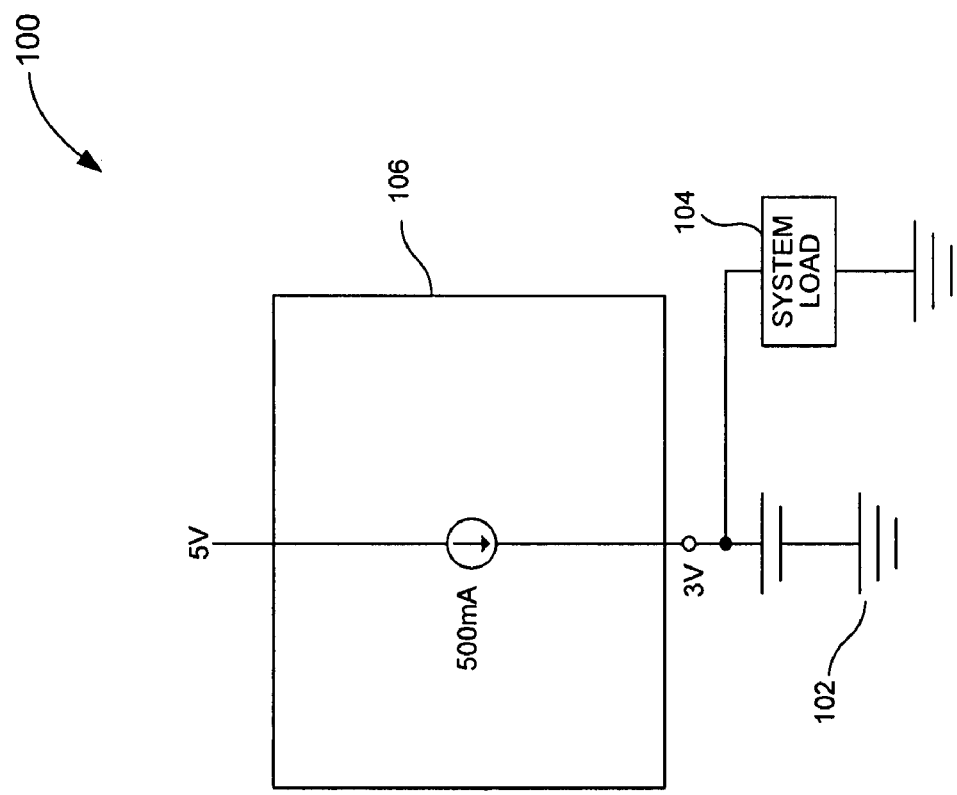

In this manner, the voltage of the battery 102 ultimately controls the amount of current drawn by the system load 104, not the voltage of the USB port 108 or the wall port 110. This is particularly disadvantageous where a battery of low voltage is used (such as a 3V battery on many portable devices), because the system needs to draw more current from a lower voltage source to meet its power demand as compared to the current drawn from a higher voltage source To illustrate the deficiency above, let's refer to FIG. 1B and assume the following: the battery 102 is a 3V battery, the power requirement of the system load 104 is 1.7 W, and a USB power source is present at 5V. As stated above, the current drawn by the system is controlled by the voltage of the battery. Thus, the current drawn by system load 104 is 566 mA, 1.7 W/3V (I=P/V). Since 566 mA is over the current limit of 500 mA of a USB power source, the rest of the 66 mA has to be drawn from the battery. Thus, in this situation, the battery 102 is not being charged by the USB power source. Instead, it is being depleted by the system load 104 even though the charger is connected to the USB power port 108.

Figure 2A:
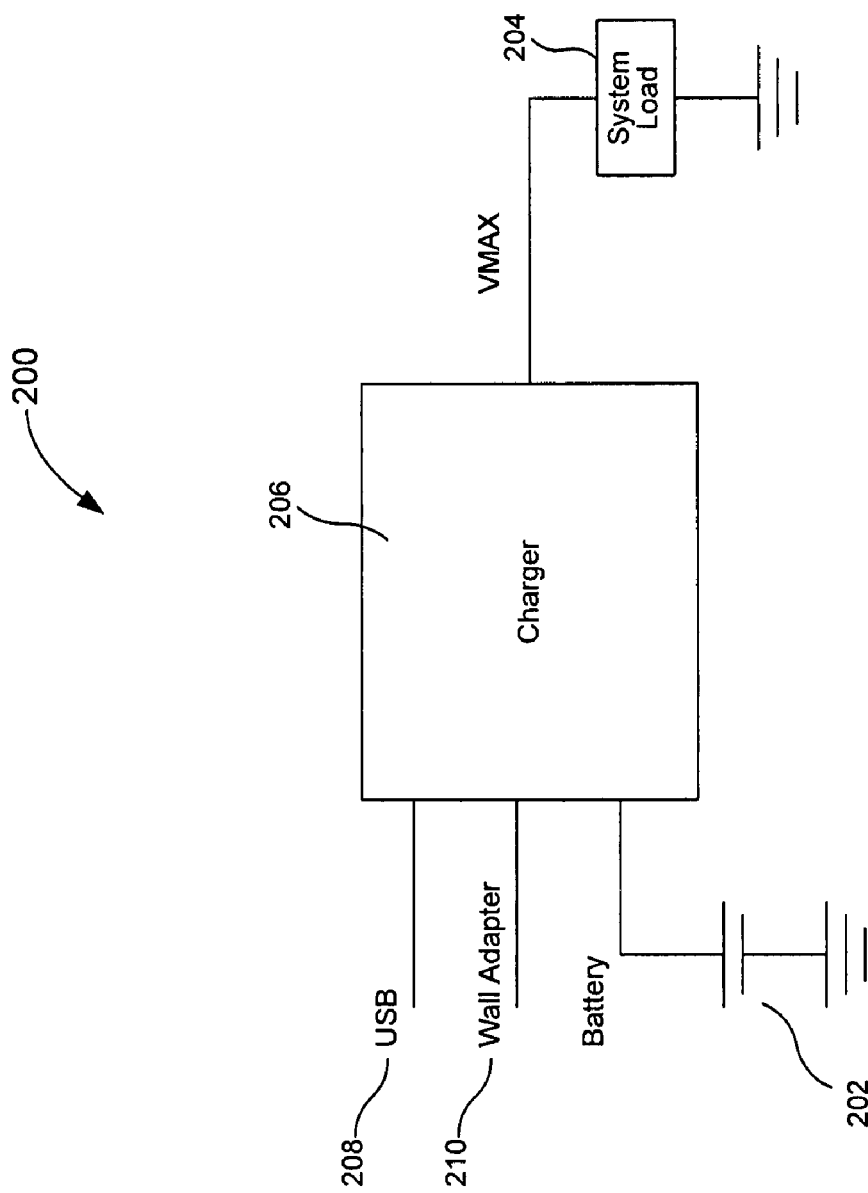

Over the years, an alternative topology has been employed to address some of the deficiencies inherent to the charger topology 100. FIG. 2A illustrates a voltage bus topology 200, an improvement over the topology 100.

As shown in FIG. 2A, bus topology 200 includes a battery 202, a system load 204, a charger 206, a USB power port 208, and a wall power port 210. The topology 200 is mainly different from the topology 100 in that the battery 202 is no longer connected directly in parallel with the system load 204. Simply stated, the battery 202 is now coupled to an input port of the charger 206 instead of being coupled in parallel with the system load 204. This architecture offers several advantages over the topology 100.

First, the system load 204 is no longer powered exclusively by the battery 202. In this topology, the system load 204 is powered by a maximum voltage source ($V_{max}$) from one of the three power sources: the battery 202, the USB power port 208, or the wall power port 210. In this manner, the life of the battery 202 may be extended because the topology 200 takes advantage of all available high voltage sources to meet the power demand of the system load 204.

Second, because of the layout configuration of the battery 202 and the charger 206, it is now possible to charge the battery 202 in certain situations that would not be possible with the topology 100. For example, using the same criteria used in the topology 100, let's assume that the system load 204 power requirement is a constant load of 1.7 W, the $V_{max}$ available is 5V from the USB port 208, and the voltage of battery 202 is 3V. In this scenario, the current drawn by the system load 204 would be 340 mA instead of 566 mA because the system is being powered by $V_{max}$ (5V) instead of the lower battery voltage. Further, the remaining unused 160 mA could be used to charge the battery 202.

Figure 2B:
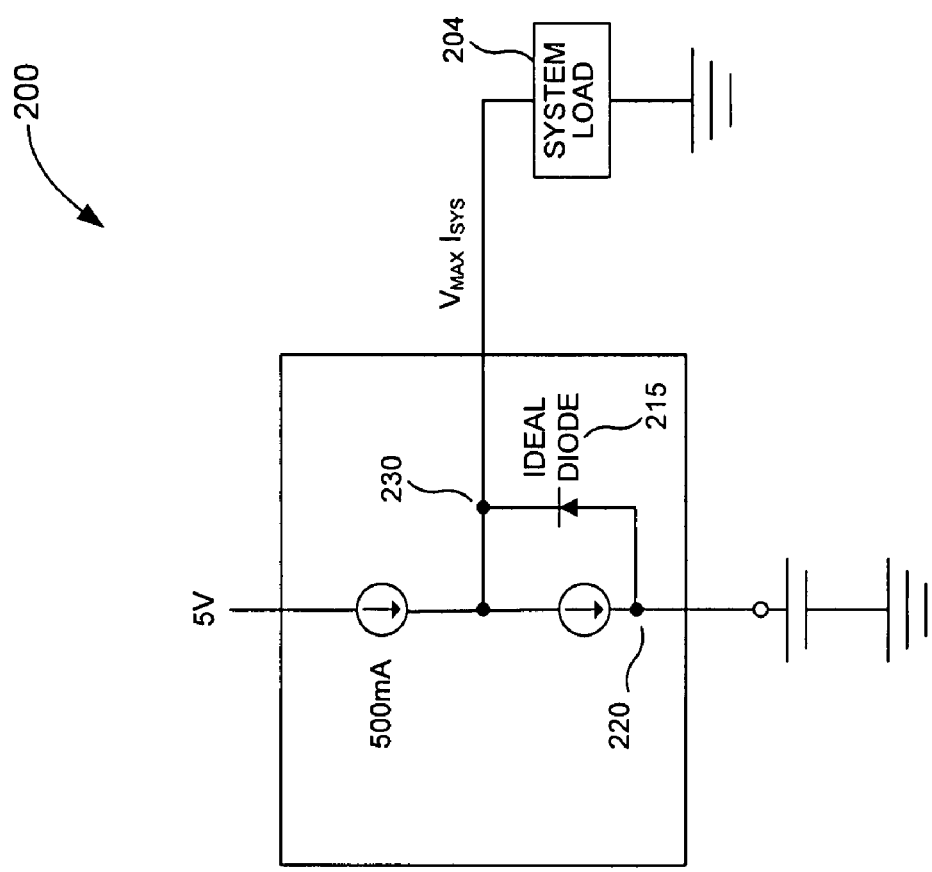

FIG. 2B further illustrates the charger 206. As shown, another major difference between the topology 100 and the topology 200 is the inclusion of diode 215 which acts as a voltage sensor and selector. The diode 215 is connected between node 220 and node 230. As shown, node the 220 is coupled to the battery 202, and the node 230 is coupled to the power port 208 or 210 and to the system load 204. In this configuration, the load system 204 will always be powered by the highest available voltage. For example, let's consider the following scenario: the battery voltage is 3V, which places node 220 at 3V; and the charger 206 is connected to a 5V USB voltage source, which means that the node 230 will be at 5V. In this scenario, the diode 215 is reversed biased, therefore current from the battery 202 will not be allowed to pass. In this way, $V_{max}$ will be at 5V instead of 3V.

However, if the charger 206 is not connected to an external power source, then the node 230 will be at 0V. In this situation, the diode 215 will be forward biased and $V_{max}$ will be at 3V. In this manner, the battery 202 is powering the system load 204.

In general, there are two major types of power supplies, a linear regulator and a pulse-width modulated (PWM) switching regulator. Both types of regulators have their own advantages and disadvantages, but each has its own niche in certain types of applications. For example, for low noise applications, linear regulators are preferred, and for noise tolerant applications, switching regulators are used, as they are more power efficient than linear regulators. Linear regulators act as a constant current load, i.e., the input (supply) current is same as the load current irrespective of the input voltage. Whereas, switching regulators act as a constant power load, i.e., the input current drawn by the regulator decreases as the input voltage increases for a given load. Most electronic devices, if not all, contain both types of regulators. For example, mobile phones and portable music players typically have several linear regulators in addition to switching regulators.

A linear regulator is best suited for a low noise applications because its output exhibits very little to no electrical noise. The response time of a linear regulator is also very short. However, a linear regulator is inefficient and can only have one output voltage. For this reason, many devices contain several linear regulators.

As mentioned, a switching regulator is preferably used to power a load that requires constant power. A switching regulator is more energy efficient than a linear regulator and can have more than one output voltage. However, switching regulator is more electrically noisy than a linear regulator.

Figure 3A:
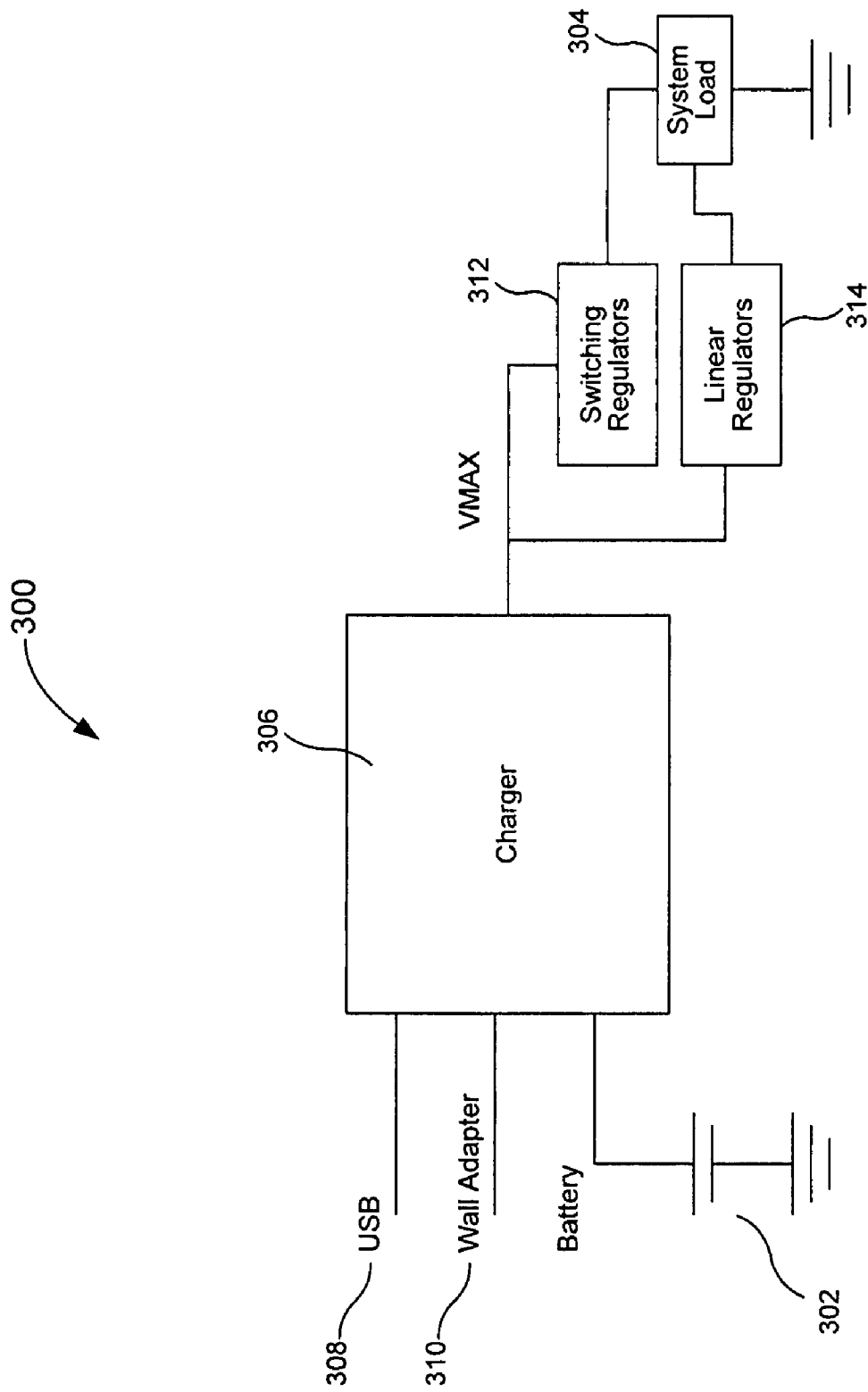

FIG. 3A illustrates a power supply system 300 that includes both types of regulators. The system 300 includes a battery 302, a system load 304, a charger 306, a USB power port 308, a wall power port 310, switching regulators 312, and linear regulators 314. The system 300 has an intermediate voltage bus topology having the switching regulators 312 and linear regulators 314 coupled between the system load 304 and $V_{max}$, at node 330. As shown, both the switching regulators 312 and the linear regulators 314 draw power from the node 330, which is the maximum voltage between the battery 302, the USB power port 308, and the wall power port 310.

Figure 3B:
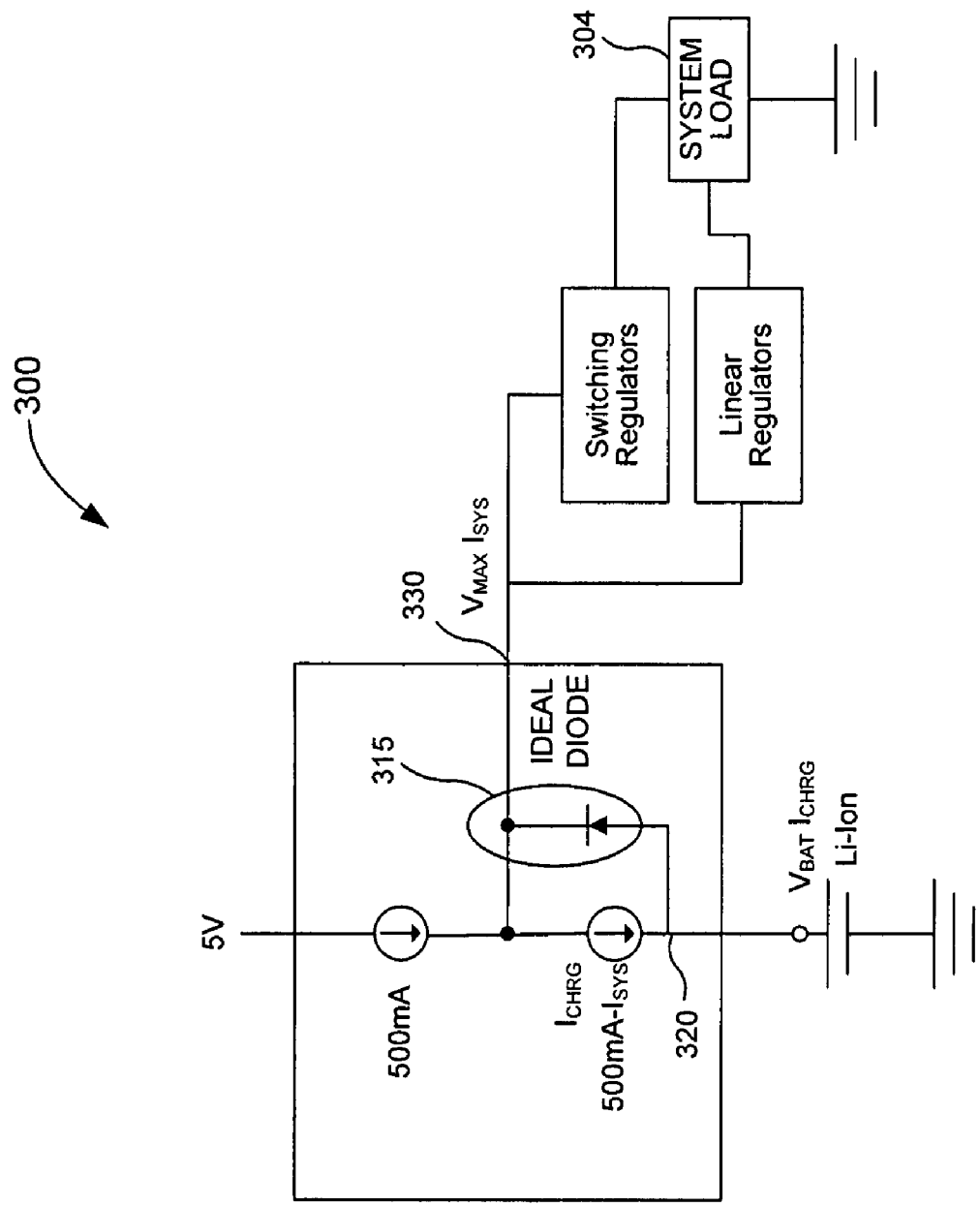

FIG. 3B illustrates the power supply system 300 being powered by a 5V voltage source, such as the USB power port 308. FIG. 3B further illustrates a diode 315 being coupled between the node 330 and node 320, which is coupled to the battery 302. Similar to the diode 215, the diode 315 is used to monitor whether another power supply is present other than the battery 302. In the case of FIG. 3B, a 5V voltage is provided by the USB port 308. Thus, the diode 315 is reversed biased, making the node 330 have a voltage of 5V.

Similar to the topology 200, the power supply system 300 will be able to charge the battery 302 in certain situations where it would not be possible with the topology 100. The system 300, however, can be further improved to allow for power saving where the combined current requirement of both the switching regulators 312 and the linear regulators 314 exceeds 500 mA. If, for example, the current requirement of both regulators is 600 mA total, the USB power port 308 will not be able to deliver this amount because its current is limited to 500 mA. As a result, the node 330 will be forced to 3V or below and the entire current load of 600 mA will be supplied by the battery, assuming a 3V battery is used.

Figure 4A:
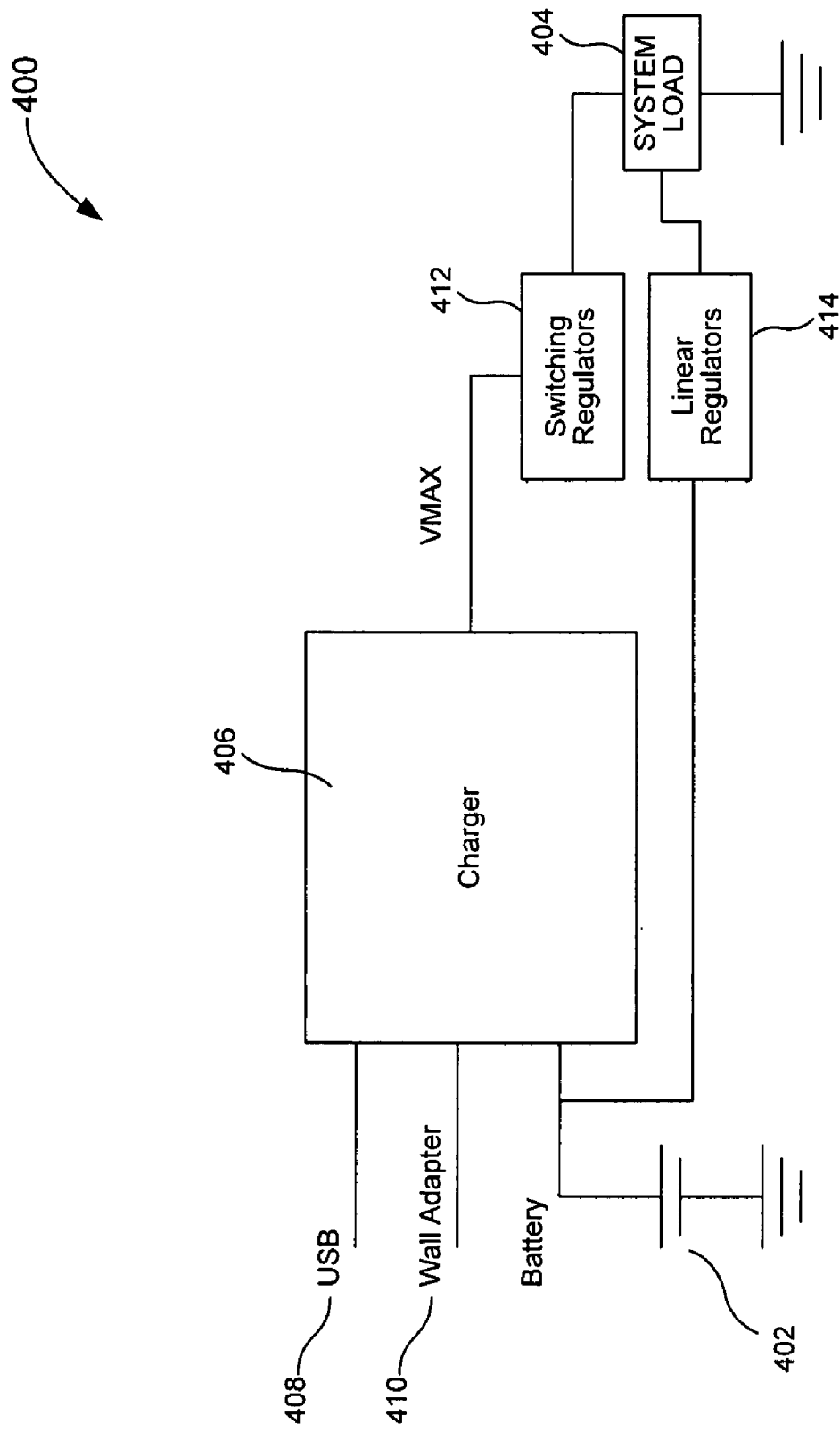

FIG. 4A illustrates a power system 400 according to an embodiment of the present invention. The power system 400 includes a battery 402, a system load 404, a charger/power management module 406, a USB power port 408, a wall power port 410, a switching regulator 412, and a linear regulator 414. The input of the switching regulator 412 is coupled to $V_{max}$. In this configuration, the input current to the switching regulator 412 decreases as $V_{max}$ increases because the switching regulator 412 is a constant power source. Hence, the larger the available voltage, the less current is needed to generate the required power. In the system 400, only portions of the system load 404 that require a constant power source are coupled to the switching regulators 412. Other portions of the system load 404 that require a constant current source are coupled to the linear regulators 414.

Figure 4B:
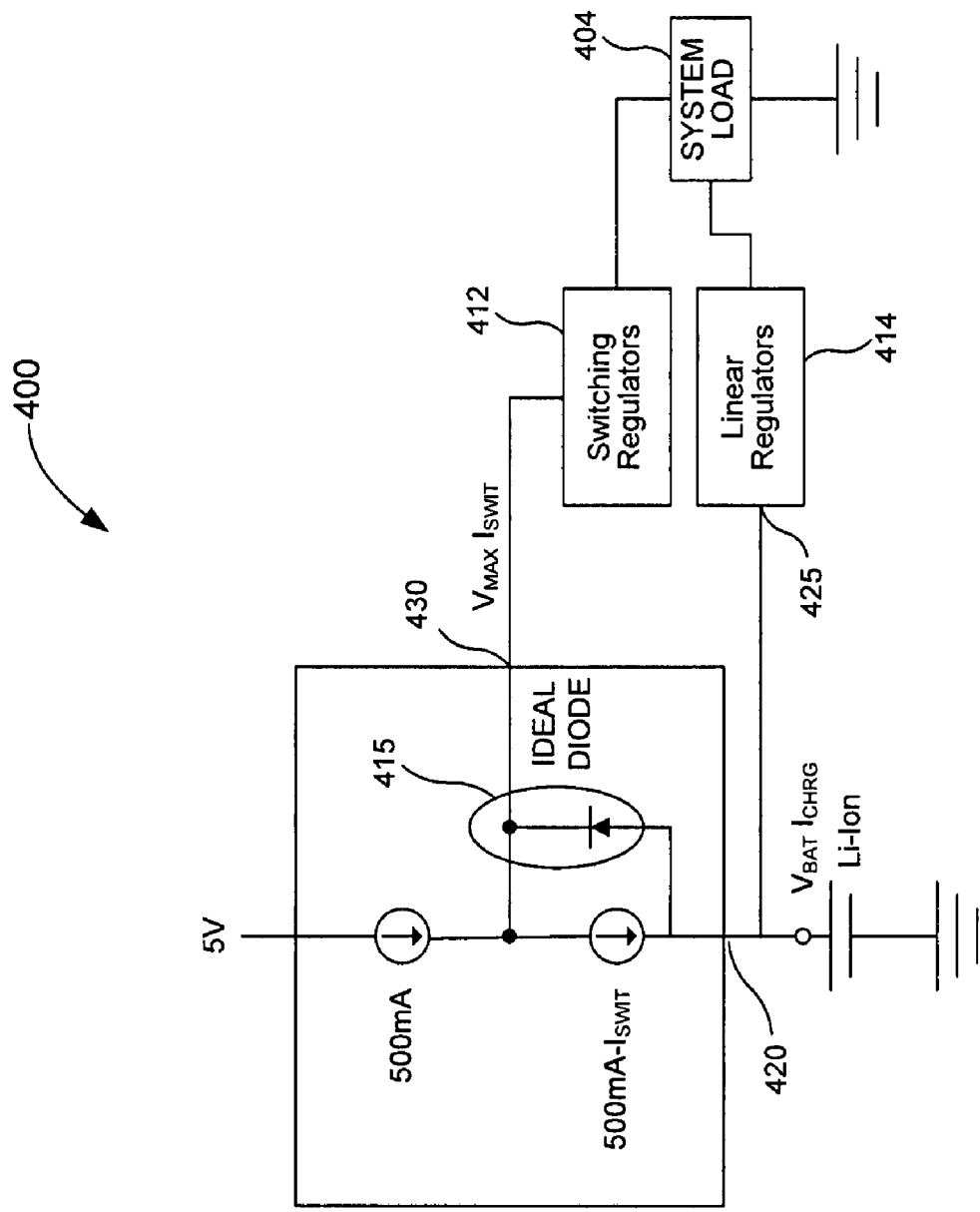

FIG. 4B illustrates the system 400 in further details. As shown, an input node 425 of the linear regulator 414 is coupled to node 420 instead of $V_{max}$ as in the case of the system 300. The node 420 is connected to the battery 402 so that the linear regulator 414 is directly connected to the battery 402. In the system 400, all of the linear regulators 414 are connected in parallel with battery 402. All of the switching regulators 412 are powered from $V_{max}$, which is similar to the system 300. This configuration is advantageous in a number of ways.

First, types of the system load 404 are intelligently separated into constant power loads and constant current loads. This allows all loads to be properly powered by switching regulator 412 and linear regulator 414.

Second, the switching regulator 412 may still take advantage of the intermediate voltage bus design by having its input coupled to $V_{max}$ as opposed to the battery voltage in the topology 100. In this manner, constant power may be provided using the maximum voltage available ($V_{max}$) and thus reducing the amount of current drawn by the switching regulators 412. In most cases, the current drawn by the switching regulator 412 will be less than the maximum current that the USB port 408 could provide, which is 500 mA. Any excess or unused current may then be used to charge the battery or be redirected to the linear regulator 414. This latter concept will be further explained below. In any case, this design helps improve power efficiency and extend the life of the battery 402.

Third, since the linear regulator 414 is directly coupled to the output node of the battery 402, a low constant current load may be directly powered by the battery 402. This may seem disadvantageous at first glance, however, if the charger 406 is coupled to a USB power source, any excess or unused current by the switching regulator 412 may be used to charge the battery 402, or to supplement the current needs of the linear regulator 414.

To illustrate, let's compare the system 300 and the system 400 in FIG. 5A and FIG. 5B, respectively, and assume the following: the batteries 302 and 402 are 3V batteries, the power requirement of each switching regulator shown is 1.7 W, each USB power source is at 5V, and the constant current requirement of each linear regulator is 200 mA. In this scenario, the total current required by both switching regulator and linear regulator would exceed 500 mA, the current limit of the USB power port. Since the current requirement exceeds the amount the power port 308 could provide, $V_{max}$ of the system 300 is forced to 3V (the same level as battery 302). As a result, the current drawn by the switching regulator 312 is equal to 1.7 W/3V, which is 566 mA. As shown, 500 mA of the 566 mA can be provided by the USB power source. The other 66 mA has to come from the battery 302. This results in a total current drain of 266 mA from the battery 302.

Applying the same scenario to the system 400 would results in a total current drain of 40 mA from the battery 402. Since the linear regulator 414 is directly coupled to the battery 402 output node, its load does not contribute to the total amount of the current switching regulator 412 may draw from $V_{max}$. Since the battery 402 directly provides the 200 mA, $V_{max}$ is allowed to stay at the voltage of the external power source. As a result, the total current drawn by the switching regulator 412 is equal to 1.7 W/5V, which is 340 mA as opposed to 566 mA in the system 300. The excess 160 mA may then be used to charge the battery 402 or used to supplement the 200 mA needed by the linear regulator 414.

In the exemplary illustrations of FIGS. 4B and 5B, a diode has been used as the power management module to select the maximum voltage source to power the switching regulator load. However, for those well versed in the relevant art, it is apparent that a diode can be replaced with other circuitry including a transistor switch. One node of the transistor switch can be coupled to the input port of the switching regulator and the second node of the switch is coupled to the battery. The switch is normally off if a power source is present and turns on only if no other power source with voltage higher than battery voltage is present.

Figure 6:
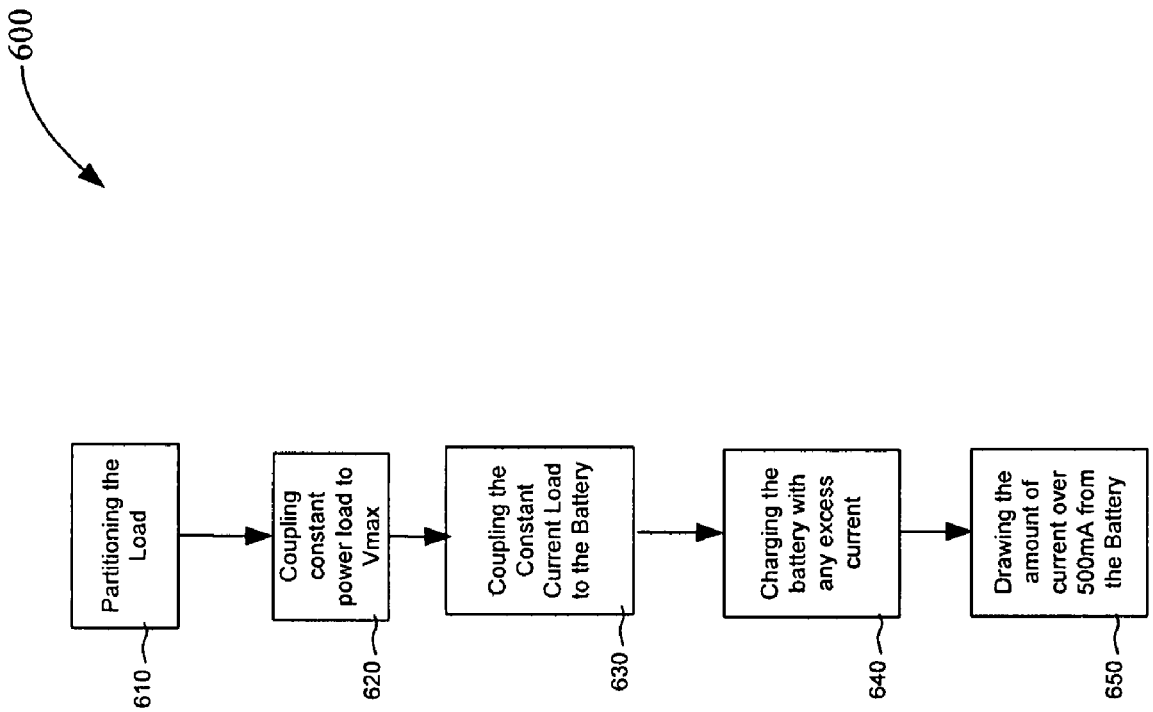
FIG. 6 illustrates a method for charging a battery and for providing power to a plurality of loads according to an embodiment of the present invention.

FIG. 6 illustrates a method 600 for charging the battery 402 and for providing power to the switching regulator 412 and the linear regulator 414. In step 610, the system load 404 is partitioned into two separate portions, a constant power portion and a constant current portion. The switching regulator 412 provides the constant power supply for the constant power portion of the system load 404. Whereas, the linear regulator 414 provides the constant current supply for the constant current portion of the system load 404.

In step 620, the constant power portion of the system load 404, including the switching regulator 412, is coupled to the node 415, which is the $V_{max}$ between the battery 402 and the power ports 408 or 410.

In step 630, the constant current portion of the system load 404, including the linear regulator 414, is coupled in parallel to the battery 402. In this way, a low constant current load may be directly powered by the battery 402.

In step 640, any excess or unused current by the switching regulator 412 may be used to charge the battery 402 or to supplement the current needs of the linear regulator 414.

In step 650, if the current requirement of both the switching regulator 412 and the linear regulator 414 exceeds 500 mA, then the amount of current over 500 mA will be drawn from the battery 402. In this way, the system 400 takes advantage of available external power sources to supplement its overall current requirement. Additionally, when the current requirement of the system 400 is lower than 500 mA, then the amount of unused current (left over from the 500 mA) can be used to charge the battery 402.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

We claim:

1. A circuit comprising:
    a battery;
    a switching regulator having an output port coupled to a load;
    a power port configured to receive power from an external source;
    a power management module configured to select a highest available voltage between the battery and the power port, and coupled to an input port of the switching regulator, wherein excess current from the power port is used to charge the battery;
    a linear regulator having an output port coupled to a load and an input port coupled to the battery.

2. The circuit of claim 1, wherein current requirements of the linear regulator are supplied by the battery.

3. The circuit of claim 1, wherein the power management module comprises:
    a diode having an anode terminal and a cathode terminal, wherein the anode terminal is coupled to the battery, and wherein the cathode terminal is coupled to the input port of the switching regulator.

4. The circuit of claim 1, wherein the power management module comprises:
    a switch wherein one terminal of the switch coupled to the battery and another terminal coupled to the input port of the switching regulators wherein the switch is turned on only if no other power source with voltage higher than the battery is available.

5. The circuit of claim 1, wherein switching regulator input port is coupled to regulated voltage which is higher than the battery and lower than the power port voltage if the power port voltage is higher than the safe operating voltage on the input port of the switching regulator load.

6. The circuit of claim 1, wherein the external power source is a universal serial bus or a wall adapter.

7. The circuit of claim 1, wherein the load is partitioned into a constant power portion and a constant voltage portion.

8. The circuit of claim 1, wherein if the current supply from the power port is insufficient, then the remaining current requirement is drawn from the battery.

9. A circuit comprising:
    a diode having an anode terminal and a cathode terminal;
    a battery having an output coupled to the anode terminal;
    a power port configured to receive power from an external source coupled to the cathode terminal;
    a switching regulator having a first input and a first output, the first input is coupled to the cathode terminal, the first output is coupled to a load; and
    a linear regulator having a second input and a second output, the second input of the linear regulator is coupled to the output of the battery, and the second output is coupled to the load.

10. The circuit of claim 9, wherein the external power source is a universal serial bus or a wall adapter.

11. The circuit of claim 9, wherein the load is partitioned into a constant power portion and a constant current portion, the constant power portion is coupled to the first output, the constant current portion is coupled to the second output.

12. The circuit of claim 9, wherein if the current supply from the power port is insufficient, then remaining current requirement is drawn from the battery.

13. A battery charger circuit comprising:
a plurality of switching regulators;
a diode having an anode coupled to a battery and a cathode coupled to an input of each switching regulator;
a plurality of linear regulators, each linear regulator having an input power port coupled to the battery; and
a power terminal coupled to the cathode, the power terminal is configured to receive power from an external source.

14. A method for charging a battery coupled to a circuit having a load and a power port for receiving power from an external source, the method comprising:
partitioning the load into a constant power portion and a constant current portion;
coupling the constant power portion to a highest available voltage between the battery and the power receiving port;
coupling the constant current load portion in parallel to the battery; and
charging the battery with any unused current from the power receiving port.

15. The method of claim 14, wherein the constant power portion is coupled to a switching regulator.

16. The method of claim 14, wherein the constant current portion is coupled to a linear regulator.

17. The circuit of claim 14, wherein if a total amount of current required by the constant power portion and the constant current portion exceeds 500 mA, then an amount of current over 500 mA is drawn from the battery.

* * * * *